W. H. SEAMON.
PROCESS OF MAKING SULFUR TRIOXID.
APPLICATION FILED JULY 13, 1918.
1,292,098.
Patented Jan. 21, 1919.
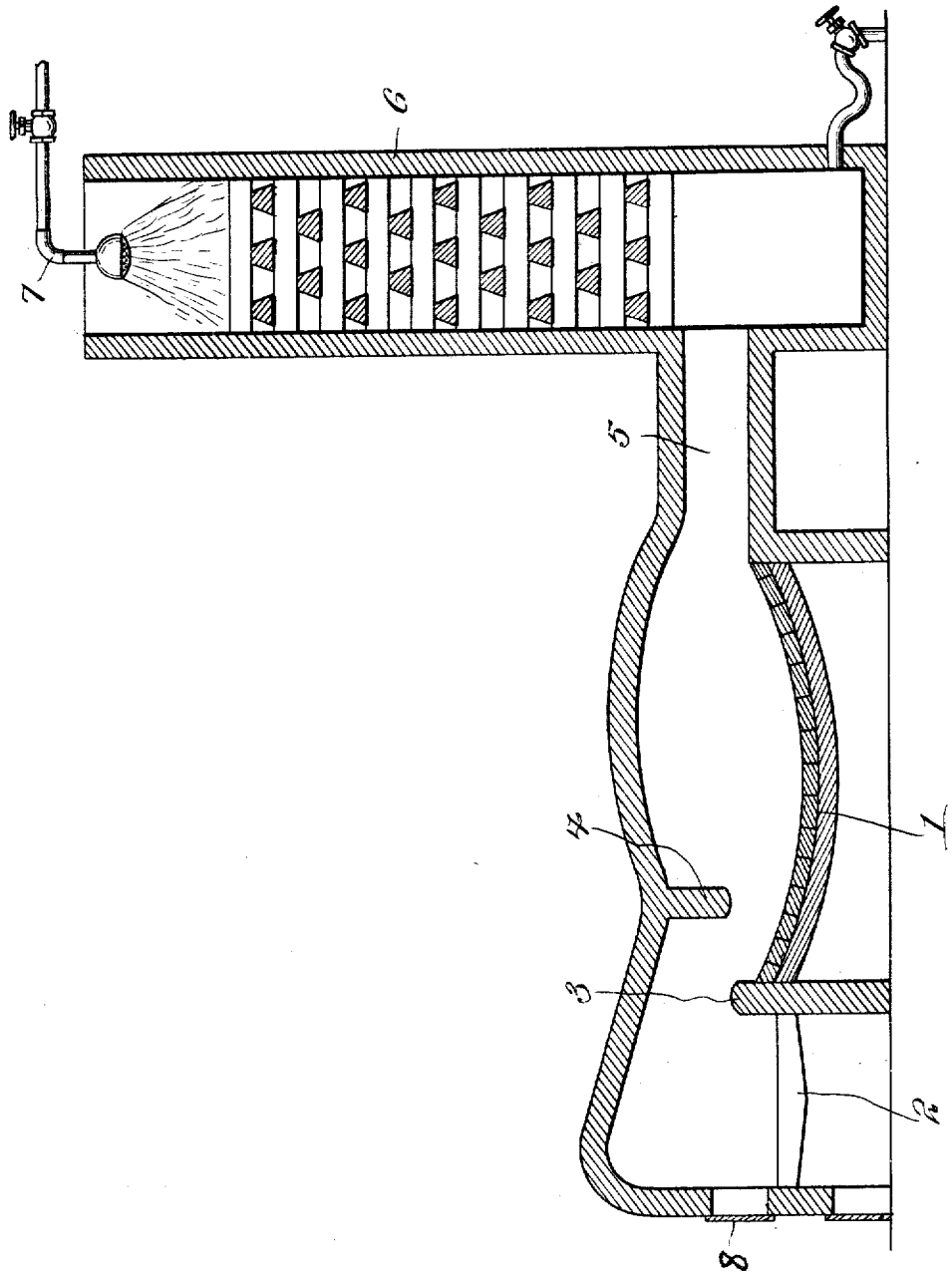
Inventor
William H. Seamon,
By F. E. Hunter
Attorney

UNITED STATES PATENT OFFICE.

WILLIAM H. SEAMON, OF EL PASO, TEXAS.

PROCESS OF MAKING SULFUR TRIOXID.

1,292,098. Specification of Letters Patent. Patented Jan. 21, 1919.

Application filed July 13, 1918. Serial No. 244,799.

*To all whom it may concern:*

Be it known that I, WILLIAM H. SEAMON, a citizen of the United States, residing at El Paso, in the county of El Paso and State of Texas, have invented certain new and useful Improvements in Processes of Making Sulfur Trioxid; and I do hereby declare the following to be a full, clear, and exact description of the invention, such as will enable others skilled in the art to which it appertains to make and use the same.

The present invention relates to a process of making sulfur trioxid, and hence a process of making sulfuric acid of any desired concentration with the production of a fused glass-like material as a by-product, and consists essentially of heating materials containing the sulfate radical with silicious matter to a temperature capable of fusing the mass and driving off substantially the entire amount of sulfur trioxid without decomposition of more than a small portion thereof, the materials employed being of such a nature that the fused mass remaining can be used directly as glass.

As a specific example of the process, to which the invention is not limited, the following example is given:

One molecular equivalent of sodium sulfate and one molecular equivalent of calcium sulfate are mixed with two molecular equivalents of silica, such as sand, and the mixture heated to a temperature sufficient to form sodium calcium silicate in a fused condition, thereby liberating substantially the entire amount of sulfur present in the form of $SO_3$ vapor or fume. This may conveniently be effected in a reverberatory furnace fired with any suitable fuel, such as gas, oil, or coal, and the gaseous products of combustion carrying the $SO_3$ vapor are then led off to an absorption apparatus, which may be a tower similar to the ordinary Gay Lussac or a Glover tower, a Lunge plate tower or equivalent device, in which the $SO_3$ is absorbed in sulfuric acid or water for the purpose, respectively, of strengthening the sulfuric acid or of forming sulfuric acid. Sulfuric acid of 97 to 99% is preferred as the absorbing medium.

The flame which comes into contact with the mixture of sulfates and silica should not be a reducing flame, but should preferably be slightly oxidizing in character. This is for the purpose of preventing to as great an extent as possible, the reduction of the $SO_3$ to $SO_2$. Also the batch of materials heated does not have added to it any reducing agents, such as coal, coke, charcoal, sawdust or the like, the effect of which also would be to reduce a considerable portion of the $SO_3$.

The mixture of calcium and sodium sulfates employed in the process may consist of a natural mineral product, found extensively in New Mexico and elsewhere, in which these two sulfates exist in substantially equimolecular proportions, ordinarily containing a small amount of sand or other silicious material, and the quantity of silica therein can, of course, be taken into consideration in preparing the raw mix from which the $SO_3$ content is to be recovered. The process can conveniently be carried out in an apparatus such as is shown diagrammatically in the accompanying drawing, which represents a vertical section of a suitable form of apparatus. In said drawing, 1 is a hearth heated by a fire on the grate 2, a bridge 3 separating the fire box from the hearth, and a wall 4 projecting the flame downwardly against the material on the hearth. The gaseous products of combustion and the $SO_3$ carried thereby pass through the flue 5, and after any suitable purification, if desired, pass into the lead lined tower 6, which as illustrated, may be filled with a suitable checker work of acid resisting bricks, which is showered with sulfuric acid from the pipe 7, terminating in a spray nozzle in the manner well understood in the art.

At 8 is shown a door for shoveling in coal, which door also allows the ingress of a sufficient quantity of air to maintain an oxidizing flame passing over the bridge 3.

I am aware that it has been heretofore proposed to make glass by melting together alkali metal sulfates and other ingredients, but in this process it has been customary to employ in the mass a sufficient amount of carbonaceous material to completely reduce the sulfate so that the sulfuric acid could not be directly recovered from the fumes.

I am also aware that proposal has been made to ignite mixtures including calcium sulfate and clay in the production of cement clinker, this process being performed in an ordinary rotary cement kiln. In this process, however, a reducing flame is ordinarily employed and at such temperatures as are usually available in cement making, the decomposition of sulfate is not substantially complete so that the cement clinker produced by such a process was of a very low value, and it was not possible to recover any considerable proportion of the sulfuric acid owing to the reduced conditions in the rotary kiln.

It is to be understood that the invention is not limited to the specific example above given, but various modifications within the scope of the appended claims are considered as being within the spirit of the invention.

I claim:

1. A process of producing sulfur trioxid which comprises fusing a mixture of materials containing sodium sulfate, calcium sulfate and silica.

2. A process of producing sulfur trioxid which comprises fusing a mixture of materials containing silica and a natural product which consists essentially of an intimate mixture of sodium sulfate and calcium sulfate.

3. A process of making sulfur trioxid with the production of a glass-like material as a by-product, which comprises heating under non-reducing conditions, a mixture comprising calcium sulfate, sodium sulfate and silica, to a temperature capable of evolving $SO_3$, and absorbing sulfur trioxid from the resulting gases and vapors.

4. A process which comprises heating to substantially complete fusion, a mixture comprising sodium sulfate, calcium sulfate and silica, said heating being effected in the absence of a reducing environment, whereby excessive decomposition of the sulfur trioxid is avoided.

In testimony whereof, I affix my signature.

WILLIAM H. SEAMON.